United States Patent
Amrein et al.

(10) Patent No.: US 9,260,239 B2
(45) Date of Patent: Feb. 16, 2016

(54) CAPSULE AND SYSTEM FOR PREPARING A BEVERAGE

(75) Inventors: Peter Amrein, Sempach (CH); Christina Marschall, Zurich (CH); Cristian Ionut Popescu, Strengelbach (CH)

(73) Assignee: DELICA AG, Birsfelden (CH)

( * ) Notice: Subject to any disclaimer, the term of this patent is extended or adjusted under 35 U.S.C. 154(b) by 58 days.

(21) Appl. No.: 13/994,494

(22) PCT Filed: Dec. 16, 2011
(Under 37 CFR 1.47)

(86) PCT No.: PCT/EP2011/073128
§ 371 (c)(1),
(2), (4) Date: Mar. 6, 2014

(87) PCT Pub. No.: WO2012/080501
PCT Pub. Date: Jun. 21, 2012

(65) Prior Publication Data
US 2014/0196608 A1     Jul. 17, 2014

(30) Foreign Application Priority Data
Dec. 17, 2010  (EP) ..................................... 10195723

(51) Int. Cl.
*A47J 31/06* (2006.01)
*A47G 19/14* (2006.01)
*B65B 29/02* (2006.01)
(Continued)

(52) U.S. Cl.
CPC ........... *B65D 85/8046* (2013.01); *A47J 31/407* (2013.01); *B65D 85/8043* (2013.01)

(58) Field of Classification Search
CPC ............ B65D 85/8043; B65D 85/8046; A47J 31/407
USPC ........... 99/295, 323; 426/77, 78, 81, 115, 433
See application file for complete search history.

(56) References Cited

U.S. PATENT DOCUMENTS 4,136,202 A     1/1979  Favre
D605,502 S  *  12/2009 Honda et al. ................... D9/429
(Continued)

FOREIGN PATENT DOCUMENTS

DE         27 52 733 A     6/1978
EP          1521541 A0     4/2005
(Continued)

*Primary Examiner* — Dana Ross
*Assistant Examiner* — Lindsey C Teaters
(74) *Attorney, Agent, or Firm* — Nath, Goldberg & Meyer; Jerald L. Meyer; Rury L. Grisham

(57) ABSTRACT

The capsule according to the invention consists of a capsule body having a side wall and having a base which is integral with the side wall. The capsule comprises a lid that covers the capsule body in order to form a closed chamber, wherein said chamber contains a substance for preparing a beverage. The base can be penetrated by a device arranged outside of the capsule in order to conduct a liquid through the chamber. The capsule body is made of plastic, wherein the base has a penetration area and a reinforcement area. A central area of the base is designed at the penetration area and the reinforcement area is arranged around the penetration area. The reinforcement area is designed as at least one recessed section in the base, said section(s) running substantially in the circumferential direction.

16 Claims, 6 Drawing Sheets

Figure 1:
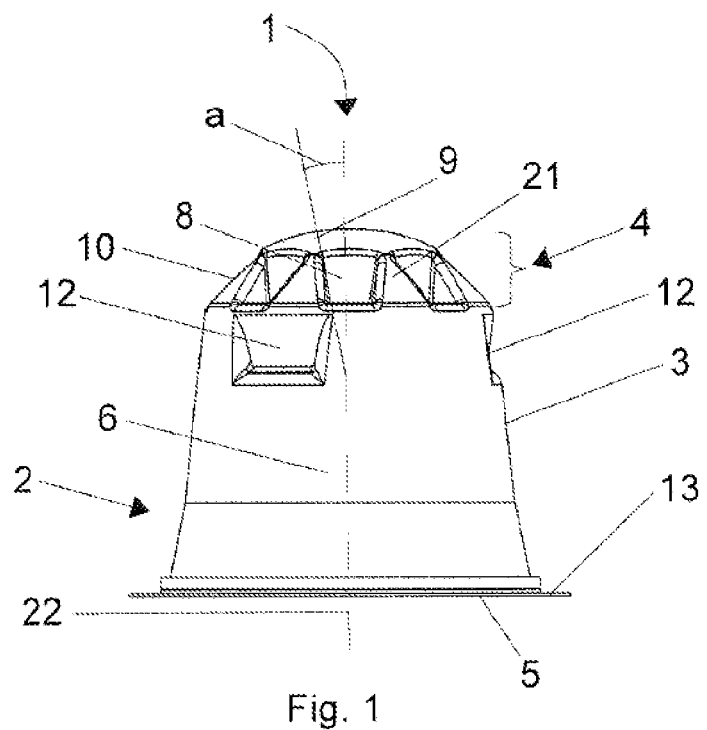

(51) Int. Cl.
  *B65D 85/804* (2006.01)
  *A47J 31/40* (2006.01)

(56) References Cited

U.S. PATENT DOCUMENTS

| | | |
|---|---|---|
| 2005/0136155 A1 | 6/2005 | Jordan et al. |
| 2005/0223904 A1 | 10/2005 | Laigneau et al. |
| 2006/0233921 A1 | 10/2006 | Mock et al. |
| 2010/0064899 A1 | 3/2010 | Aardenburg et al. |
| 2011/0212225 A1* | 9/2011 | Mariller ................. 426/80 |

FOREIGN PATENT DOCUMENTS

| | | | |
|---|---|---|---|
| EP | 1579791 | A1 | 9/2005 |
| EP | 1580144 | A1 | 9/2005 |
| EP | 1897819 | A1 | 3/2008 |
| EP | 1 944 248 | A1 | 7/2008 |
| EP | 1944248 | A1 | 7/2008 |
| EP | 2179943 | A1 | 4/2010 |
| EP | 2230195 | A1 | 9/2010 |
| FR | 2842090 | A1 | 1/2004 |
| WO | 03059778 | A2 | 7/2003 |
| WO | 2007132409 | A1 | 11/2007 |
| WO | 2007137974 | A2 | 12/2007 |
| WO | 2008136026 | A1 | 11/2008 |
| WO | 2009053811 | A2 | 4/2009 |
| WO | 2009084059 | A1 | 7/2009 |
| WO | 2009110783 | A2 | 9/2009 |
| WO | 2010/041179 | A2 | 4/2010 |
| WO | 2010041179 | A2 | 4/2010 |
| WO | 2010/137955 | A1 | 12/2010 |
| WO | 2011032718 | A1 | 3/2011 |

* cited by examiner

CAPSULE AND SYSTEM FOR PREPARING A BEVERAGE

This is a National Phase Application filed under 35 U.S.C. 371 as a national stage of PCT/EP2011/073128, filed Dec. 16, 2011, and claims priority from European Application No. 10195723.1, filed Dec. 17, 2010, the content of each of which is hereby incorporated by reference in its entirety.

The present invention relates to a capsule as claimed in the preamble of claim 1 and to a method for preparing the beverage.

These types of capsules, which are in particular just used once and once used to produce the beverage are disposed of, are widely distributed today as portion packagings for the preparation of, for example, coffee or tea. The user, therefore, no longer has to be bothered about measuring out the correct amount of coffee and after the extraction operation the capsule together with the contents can be disposed of.

DE 27 52 733 makes known a cartridge which contains a substance for the production of a beverage using a machine. Said cartridge has a substantially thick body in the form of an acute-angled truncated cone, said cartridge usually being produced from aluminum sheet.

The disadvantage of said known prior art, however, is that the use of aluminum as material for a capsule or capsule body is, on the one hand, very costly. In addition, the use of aluminum for in particular capsules which are to be used just once is disadvantageous to the environment as the energy consumption for the production of aluminum is high and large amounts of aluminum waste are created once the capsules have been used.

EP 1 944 248 A1 makes known a plastics material capsule which contains a substance for the production of a beverage using a machine. A reinforcement zone is arranged in a central region of the base of the capsule in order to prevent the base being inadmissibly deformed as tearing stress is built up directly prior to the penetration.

The disadvantage of said known prior art, however, is that the capsule is not suitable to be used in commonly available machines for beverage production as the reinforcement of the base thereof is frequently insufficient for the reliable penetration of the base.

It is, consequently, an object of the present invention to avoid the disadvantages of what is known, in particular therefore to provide a capsule which is less environmentally harmful in production and also in disposal, is able to be produced in a cost-efficient manner and which allows for reliable penetration of the base using commonly available machines for the preparation of beverages.

Said object is achieved by a capsule with the features in claim 1.

The capsule as claimed in the invention consists of a capsule body having a side wall and having a base which is realized integrally with the side wall. The capsule body is preferably rotationally symmetrical. The capsule includes a lid which covers the capsule body for forming a closed chamber, which contains a substance for the preparation of a beverage. For conducting a liquid through the chamber, at least the base is penetratable at a penetration region of the base by a device which is arranged outside of the capsule. The base has a reinforcement region. A central region of the base is realized as a penetration region, wherein the reinforcement region is arranged around the penetration region. In particular, the reinforcement region is arranged in a rotationally symmetrical manner around the penetration region. The reinforcement region is realized in the base as at least one portion-wise recess substantially in the circumferential direction. In other words, the reinforcement region has one or several portion-wise recesses in the base substantially in the circumferential direction.

The term "a recess in the base" refers from this point and below to a recess on an outer surface of the capsule, i.e. the side of the capsule which is remote from the closed chamber.

The term "a portion-wise recess in the base substantially in the circumferential direction" refers from this point and below to the recess having in the circumferential direction an extent which is smaller than the circumference of the capsule.

The phrase "the base has recesses" refers from this point on and below to the recesses, which are also designated as indentations, being integral component parts of the base. Recesses in the sense of the present application are consequently therefore not recesses between external elements on the base which, for example, are mounted on the outside of said base.

Where softer material than aluminum is used for the capsule, there is frequently the problem of said capsules not being reliably pierced using usual commercially available apparatuses for beverage production as said softer material, contrary to aluminum, is often more yielding and easier to deform without the capsule being penetrated by way of the corresponding device of the apparatus for penetration. This is, however, necessary for the operation of beverage production. For example, even plastics material capsules from the prior art which already have a reinforced base are often not penetrated in a reliable manner.

The capsule as claimed in the invention now has the advantage of the capsule being penetratable in a reliable manner through the reinforcement region with portion-wise recesses in the base by means of commercially available apparatuses for beverage production such that beverage production is made possible. In addition, the capsule is also producible in a cost-efficient manner as the reinforcement region is realized as an integral component part of the capsule and the capsule can consequently be produced for example using a deep-drawing method.

The advantage of portion-wise recesses compared in particular to circumferential recesses or even circumferential ribs on or in the base is that they bring about a better reinforcement effect. Circumferential recesses or even circumferential ribs in the base therefore often result in insufficient reinforcement.

The term "a penetration region" in the sense of the present application refers to a region of the base which is penetrated by the device for penetration.

The term "a reinforcement region" in the sense of the present application refers to a region of the base in which the recesses are arranged for reinforcement.

The term "a central region of the base" refers from this point on and below to said region providing a face and including at least the geometric center point of the capsule base.

The term "rotationally symmetrical" refers here and below to a symmetry with reference to rotation about the longitudinal axis of the capsule by a discrete angle or however also by arbitrary angles.

The advantage of said arrangement of the penetration region in a central region of the base with a reinforcement region arranged around it is that as a result, very good reinforcement of the penetration region is achievable such that the capsule is able to be penetrated in a reliable manner using the device for penetration of the apparatus for beverage preparation.

In a preferred manner, the recess has at least two wall portions which are inclined toward one another.

In a preferred manner the recess has three wall portions which are inclined toward one another. A first wall portion lies in a cutting plane, which extends along the longitudinal axis of the capsule body, i.e. through the recess, substantially parallel to the longitudinal axis of the capsule body. As an alternative to this, the first wall portion encloses an angle with the longitudinal axis within the range of ±20°, in a preferred manner of ±10° and quite especially preferred of ±5°. A second wall portion encloses a first external angle with the first wall portion within the range of between 35° and 55°, in a preferred manner between 40° and 50°. A third wall portion encloses a second external angle with the second wall portion within the range of between 35° and 55°, in a preferred manner between 40° and 50°.

In the sense of the present application, the term "external angle" refers to an angle between two wall portions which intersect on a line, the angle being determined on the side which is remote from the closed chamber of the capsule.

In a particularly preferred manner, the at least one portion-wise recess is realized in a step-shaped manner and/or is realized in an L-shaped manner in a cutting plane which extends along the longitudinal axis of the capsule body, i.e. through the recess. Where the recess is realized in an L-shaped manner, in particular one arm of the L-shape lies substantially parallel to the longitudinal axis of the capsule body. As an alternative to this said arm of the L-shaped form encloses an angle with the longitudinal axis within the range of ±20°, in a preferred manner of ±10° and quite especially preferred of ±5°. In particular a second arm of the L-shape lies substantially at right angles to the longitudinal axis or encloses an arm angle with the longitudinal axis within the range of between 70° and 110°, in a preferred manner between 80° and 100° and quite especially preferred between 85° and 95°.

The advantage of said development of the at least one recess of the capsule is that through the step-shaped or L-shaped realization of the portion-wise recess or through the realization of the portion-wise recess with three wall portions which are inclined toward one another, particularly good reinforcement of the capsule base can be achieved. As a result, reliable penetration of the base using the device for penetration of the apparatus for beverage production is achieved.

The L-shaped realization of the recess can also be combined, where required, in a capsule with the portion-wise recess with three wall portions which are inclined toward one another, for example in an alternating manner. In addition, it is also conceivable for the two arms of the L-shape to be combined with a further wall portion which corresponds with the second wall portion, the two arms of the L-shape being connected together by the second wall portion; consequently a further development possibility of the portion-wise recess with three wall portions which are inclined toward one another can be formed.

In a particularly preferred manner, the portion-wise recess has at least one face portion parallel to a cutting plane, which extends along the longitudinal axis of the capsule body, through the recess or encloses an angle with said cutting plane within the range of ±45°, in a preferred manner of ±30° and quite especially preferred of ±15°. In a preferred manner, an angle within the range of ±10° and particularly preferred of ±5° is enclosed.

The advantage of said development of the at least one recess of the capsule is that through the realization of the portion-wise recess by means of the orientation of the face portion, much better reinforcement is made possible.

In particular, the cutting plane runs along the longitudinal axis of the capsule body through the center point of the circumferential portion of the recess which is facing the central region of the base.

In a quite especially preferred manner, the base has at least two recesses and in a preferred manner between three and ten recesses.

The advantage of said development is that through the selectable number of recesses in the base for reinforcement, adaptation to the respective requirements with reference to the rigidity of the base is possible. The number of recesses can be effected, for example, in dependence on the selected material of the capsule body or also in dependence on the apparatus for beverage production in which the capsule is to be used.

In an alternatively preferred manner, the base between the recesses is realized in particular as a triangular web.

The advantage of this is further improvement of the reinforcement of the base to achieve an even more reliable penetration of the base by means of the device for penetration of the apparatus for beverage production.

In a quite especially alternatively preferred manner, the capsule wall has at least one inside projection as a stacking shoulder. In a preferred manner, the capsule wall has two and in a particularly preferred manner at least three inside projections. In addition the capsule wall has outside recesses which are complementary to the inside projections.

The phrase "the capsule wall has outside recesses which are complementary to the inside projections" refers here and below to the outside recesses being located at the same positions as the inside projections of the capsule wall.

The term "an inside projection" refers in the sense of the present application to the chamber for accommodating a substance having projections in the capsule wall.

The advantage of said development of the capsule wall with inside projections is that the not yet filled capsule bodies can be stacked and are easily separatable again as a result of the inside projections as the stacked capsules are prevented from becoming wedged. The advantage of this is that for example on a production line for filling with coffee, the capsule bodies are able to be individually singled out in a reliable manner. For example, the capsule bodies can be automatically removed from a stack by means of a gripping arm such that in each case in a reliable manner only one capsule is introduced into the filling apparatus.

In an additionally preferred manner, the inside projections are spaced apart from one another along the circumference.

The phrase "the inside projections are spaced apart from one another along the circumference" refers from this point on and below to the inside projections not overlapping completely when projected along the capsule wall parallel to the longitudinal axis of the capsule.

The advantage of said arrangement of the inside projections is that the capsule bodies can be separated simply and reliably from one another when they are stacked one on top of the other.

The additional advantage of the outside recesses is that the capsule body is easily grippable on the outside by corresponding devices of the filling apparatus.

In a preferred manner the capsule body consists of plastics material and in a particularly preferred manner of at least one biopolymer.

The advantage of this is that the capsule body can be produced in a more energetically favorable manner compared to the prior art, in particular compared to capsules of aluminum. In addition, the waste occurring after use is also easier to dispose of than in the case of commercially available aluminum capsules.

The term "plastics material" in the sense of the present application refers to an organic polymer which is essentially produced from organic molecules or also a biopolymer and arbitrary combinations of said materials.

The term "biopolymer" in the sense of the present application refers to a naturally occurring polymer and in particular a biologically degradable biopolymer.

In an additionally particularly preferred manner, the capsule body consists of at least two polymer layers. In particular the capsule body is produced using a deep-drawing method, in a particularly preferred manner an outer layer of the capsule body consisting of polyethylene.

The advantage of producing the capsule body from at least two polymer layers is that these can be selected corresponding to the intended purpose, for example in dependence on the apparatus to be used for beverage production. By constructing the capsule body in layers, it is additionally possible to select which characteristics, for example with reference to softness, the outer or also inner layer is to have.

In particular, one of the layers consists of polyethylene and the other of polypropylene. As an alternative to this, one of the layers can also consist of ethylene vinyl alcohol.

In particular, in an advantageous manner the capsule body consists of at least three layers, in an especially advantageous manner it consists of at least four layers and in a quite especially advantageous manner it consists of at least five layers.

In particular, said layers consist in each case of one of the following materials or of an arbitrary combination therefrom: polypropylene, polyethylene and ethylene vinyl alcohol.

The advantage of producing the capsule body using a deep-drawing method is that the production of the capsule body using said method is cost-efficient and allows for a high throughput through the apparatus for deep-drawing.

In addition, in a quite especially preferred manner the capsule body has a flange which protrudes laterally beyond the capsule wall for fastening the lid.

The advantage of this is that the lid can be fastened in a reliable manner to the capsule wall as the capsule body has a sufficiently large face for fastening the lid in the region of the flange.

In addition, the advantage of the flange is that the positioning of the capsule in the apparatus for beverage production is improved.

In addition, in a preferred manner the lid is formed from a membrane, a perforated foil or filter paper. In particular, the membrane is realized as aluminum foil. As an alternative to this, the lid can also be formed from an arbitrary combination of aluminum foil, perforated foil and filter paper.

The term "a membrane" in the sense of the present application refers to a foil which is substantially impervious to air and is tearable in the beverage production apparatus.

The advantage of using a membrane and in particular an aluminum foil as a lid is that this means that the capsule is closable in a substantially air-tight manner and consequently the capsule is aroma-tight. Consequently, the packaging of the capsule for purchase in an additional, air-tight covering is not necessary, which is cost-efficient and simplifies the handling of the capsules for beverage production.

The advantage of using a perforated foil or filter paper or arbitrary combinations thereof as a lid is that no devices for perforating or tearing the lid are required in the apparatus for beverage production for discharging the beverage through the lid. In addition, the perforation of the foil or also the structure of the filter paper, such as, for example, the size and arrangement of the filter openings, can be selected such that an optimum flow of the liquid through the capsule is achieved to achieve a high level of quality of the produced beverage. In this way, it can be achieved in particular that as large a proportion as possible of the extracted substance is also extracted.

In a preferred manner, the penetration region is dome-shaped.

The term "dome-shaped" in the sense of the present application refers to a curved region of the base, the curvature being directed outward, i.e. away from the closed chamber.

The advantage of this is that the base in the case of certain apparatuses for producing, for example, a coffee beverage is turned in operation toward the device for penetrating the base and consequently the penetration is able to be effected in a more reliable manner.

In an especially preferred manner, the penetration region has a center indentation, which, in particular, is circular. The forming of a closed reinforcement line is achieved in particular by the center indentation.

The term "a center indentation" in the sense of the present application refers to an indentation, i.e. a recess, in the base which includes the geometric center point of the capsule base.

The term "a closed reinforcement line" in the sense of the present application refers to a line which runs around the center indentation in the penetration region and is consequently closed.

The advantage of said development of the penetration region with a center indentation is that the region lying between the reinforcement region and the center indentation is reinforced further for even more reliable penetratability by means of commercially available apparatuses for beverage production.

In an especially preferred manner, the capsule wall has at least one reinforcement rib which is arranged on the outside substantially parallel to the longitudinal axis. In a preferred manner, the reinforcement rib consists of the same material as the capsule wall and in a particularly preferred manner the capsule body including the capsule wall and the reinforcement rib are realized integrally.

The phrase "arranged substantially parallel to the longitudinal axis" with reference to the arrangement of the reinforcement rib refers in the sense of the present application to the reinforcement rib being arranged on the capsule wall and the longitudinal axis of the reinforcement rib lying substantially parallel to the longitudinal axis of the capsule body. Where, for example, a truncated cone-shaped capsule body is used, the longitudinal axis of the reinforcement rib and also the longitudinal axis of the capsule body enclose an angle which is substantially the same as the truncated cone angle; also in the case of this type of development of the capsule body, in the sense of the present application it refers to the longitudinal axis of the capsule body and the longitudinal axis of the reinforcement rib running substantially parallel to one another.

The term an "outside arrangement" of the reinforcement rib refers in the sense of the present application to the reinforcement rib being arranged on the side which is remote from the closed chamber.

The advantage of the arrangement of a reinforcement rib on the capsule wall is that the stability of the capsule body in relation to deformation forces parallel and at right angles to the longitudinal axis of the capsule body is increased and consequently, for example, the handling during the filling process of the capsule is more reliable. The advantage of this in addition is that, for example, on a production line for filling with coffee, the capsule bodies are able to be singled out individually in a more reliable manner.

In a preferred manner, the capsule wall has at least two reinforcement ribs which are spaced apart from one another along the circumference.

The advantage of this is the further increase in stability as explained above.

In an especially preferred manner, the rib length of the reinforcement rib is smaller than the capsule wall length.

The term a "rib length" in the sense of the present application refers to the longest extent of the reinforcement rib.

In particular, the capsule wall length does not include the base of the capsule with, for example, the reinforcement region.

The rib length and the capsule wall length in the sense of the present application are determined according to a projection along the longitudinal axis; where a truncated cone-shaped capsule body is used, for example, the capsule wall length and the rib length correspond to a projection at right angles to the longitudinal axis along the longitudinal axis.

The advantage of this is better adaptability of the outer shape of the capsule to different beverage production apparatuses.

In a quite especially preferred manner, the capsule body is realized as a truncated cone, wherein a truncated cone angle between the longitudinal axis and the capsule wall is different in portions along the longitudinal axis.

The phrase "a truncated cone angle is different in portions along the longitudinal axis" refers in the sense of the present application to the fact that along the longitudinal axis the capsule wall encloses a first truncated cone angle with the longitudinal axis for example in a first portion and encloses a second truncated cone angle in a second portion, the first and the second truncated cone angles deviating from one another.

In a preferred manner, the capsule body has at least three portions with a different truncated cone angle.

The truncated cone angles enclose an angle w with the longitudinal axis within the range of between 1° and 30°, in a preferred manner between 2° and 25° and in an especially preferred manner between 4° and 20°. In particular, the angle w of a first portion, which is facing the flange, is greater than the angle w of the second portion, the angle w of the second portion being greater than the angle w of the third portion. The third portion is the portion facing the base.

The advantage of said development of the capsule body with a truncated cone shape with portion-wise different truncated cone angles is that the stability with reference to an effect of force on the capsule body is improved substantially along the longitudinal axis of the capsule body, which leads to a higher level of reliability being achieved when the capsule is penetrated by the device for penetration.

An additional aspect of the invention relates to a capsule consisting of a preferably rotationally symmetrical capsule body having a side wall and having a base, which is realized integrally with said wall, as well as having a lid which covers the capsule body for forming a closed chamber, which includes a substance for the preparation of a beverage. The capsule body consists of plastics material. In a preferred manner the capsule body consists of two polymer layers, in a particularly preferred manner of at least two polymer layers.

In a preferred manner, an outer layer of the two polymer layers is softer than an inner layer. In particular, the softness of the outer layer is selectable in such a manner that a sealing function is achievable when the capsule is used correctly in the apparatus.

The term an "outer layer" refers in the sense of the present application to the layer which is located right on the outside with reference to the chamber, i.e. remote from the chamber. In particular, the outer layer is that layer which is, for example, in contact with the capsule holder when the capsule is used correctly in the apparatus.

Through the layer structure of the capsule body, it can be selected in an advantageous manner which characteristics with reference to softness the outer layer is to have, as a result of which, for example, the behavior of the capsule in the apparatus when used correctly can be adapted to the apparatus.

In particular, a glass transition temperature of the outer layer is lower than a glass transition temperature of the inner layer. In a preferred manner, the temperature difference between the glass transition temperatures is at least 5° C., in a particularly preferred manner at least 10° C. In a preferred manner, the glass transition temperature of the outer layer is within the range of between 60° C. and 90° C., in a particularly preferred manner between 65° C. and 85° C. In a preferred manner, the glass transition temperature of the inner layer is higher than 85° C., in a particularly preferred manner higher than 90° C. and in a quite especially preferred manner higher than 95° C.

In a particularly preferred manner, one of the layers consists of polyethylene and the other of polypropylene. In particular, the outer layer consists of polyethylene and the inner layer of polypropylene. As an alternative to this, one of the layers can also consist of ethylene vinyl alcohol.

In particular, in an advantageous manner the capsule body consists of at least three layers, in a particularly advantageous manner it consists of at least four layers and in a quite especially advantageous manner, it consists of at least five layers.

In a quite particularly preferred manner, said layers consist in each case of one of the following materials or an arbitrary combination therefrom: polypropylene, polyethylene and ethylene vinyl alcohol.

In a preferred manner, substantially the entire capsule surface, which is formed by the outer layer, is softer than an inner layer.

The term "capsule surface" refers to the surface of the capsule body which is remote from the chamber.

In particular, the capsule body is produced using a deep-drawing method.

In a particularly preferred manner, the capsule body has a flange which protrudes laterally beyond the capsule wall for fastening the lid.

In a preferred manner the lid is formed from a membrane, a perforated foil or filter paper. In particular, the membrane is realized as an aluminum foil. As an alternative to this, the lid can also be formed from an arbitrary combination of aluminum foil, perforated foil and filter paper.

In a particularly preferred manner, the capsule wall has at least one reinforcement rib which is arranged on the outside substantially parallel to the longitudinal axis. In a preferred manner the reinforcement rib consists of the same material as the capsule wall and in a particularly preferred manner the capsule body including the capsule wall and the reinforcement rib are realized integrally.

In a preferred manner the capsule wall has at least two reinforcement ribs which are spaced apart from one another along the circumference.

In a particularly preferred manner, the rib length of the reinforcement rib is smaller than the capsule wall length.

In a quite particularly preferred manner the capsule body is realized as a truncated cone, wherein a truncated cone angle between the longitudinal axis and the capsule wall is different in portions along the longitudinal axis.

In a preferred manner the capsule body has at least three portions with a different truncated cone angle.

In a quite especially alternatively preferred manner, the capsule wall has at least one inside projection as a stacking shoulder. In a preferred manner, the capsule wall has two and in a particularly preferred manner at least three inside projections. In addition the capsule wall has outside recesses which are complementary to the inside projections.

In an additionally preferred manner, the inside projections are spaced apart from one another along the circumference.

The above-mentioned technical features with reference to the additional aspect of the present invention have the advantages mentioned further above.

A further aspect of the present invention relates to a capsule body for a capsule as described above.

As the capsule body is used for the above-described capsule, it has all the advantages described above.

A further aspect of the present invention is directed to a portion packaging including a capsule which is filled with a substance as described above. In particular, said capsule contains coffee. The capsule is surrounded by a substantially air-tight covering.

The capsule in the portion packaging corresponds to the capsule described above and consequently has the advantages thereof.

The advantage of said portion packaging is that the capsule can be sealed in an aroma-tight manner, which is advantageous in particular in the case of coffee. Said covering is used in particular in an advantageous manner when using a perforated foil or filter paper as a lid as described above in order to seal the capsule for storage and transport in an aroma-tight manner, i.e. substantially air-tight. Even when using an aluminum foil, the use of the covering for substantially air-tight sealing can be advantageous should the aluminum foil become damaged or not be connected to the capsule body in a substantially air-tight manner.

An additional aspect of the present invention is directed to a system including a capsule which is filled with a substance as described above or with a portion packaging as described above. In addition, the system includes a beverage production apparatus, wherein the beverage production apparatus has a capsule holder for accommodating the capsule as well as a device for penetrating a base of the capsule. In addition, the beverage production apparatus has a device for supplying a liquid into the capsule for extracting the substance for producing a beverage. The beverage can be discharged through a lid of the capsule.

Said system includes a capsule as described above and consequently has all the advantages described above.

The beverage production apparatus additionally has in particular a device for discharging the beverage, for example into a drinking container.

Where a membrane and in particular an aluminum foil is used as a lid which is not perforated, the beverage production apparatus additionally has a tearing apparatus such that the beverage is able to be discharged through the lid.

Where a capsule with a perforated foil or filter paper as a lid is used, no tearing device is necessary in the beverage production apparatus. It is, however, also conceivable to use a beverage production apparatus with a tearing device in conjunction with a capsule with a perforated foil or filter paper as a lid.

An additional aspect of the present invention is directed to the use of a capsule which is filled with coffee as described above or of a portion packaging as described above to produce a coffee beverage.

Said use has all the described advantages of the above-described capsule or portion packaging.

A further aspect of the present invention is directed to a method for beverage production. In a first step of the method a capsule, which is filled with a substance as described above, is inserted into a capsule holder of a beverage production apparatus. A base of the capsule is then penetrated by means of a device for penetration of the beverage production apparatus. A liquid is then supplied into the capsule at a pressure within the range of between 1 bar and 20 bar. The liquid is in particular heated, in particular being water. By means of the supplied liquid a beverage is extracted out of the substance in the capsule. The beverage is then discharged through a lid of the capsule. The lid has openings for discharging the beverage. As an alternative to this, the lid is torn off by means of the supplied liquid, with the cooperation of a tearing device of the beverage production apparatus, for discharging the beverage.

A capsule as described above is used in the method for beverage production. Said method consequently has all the advantages of the above-described capsule.

Figure 2:
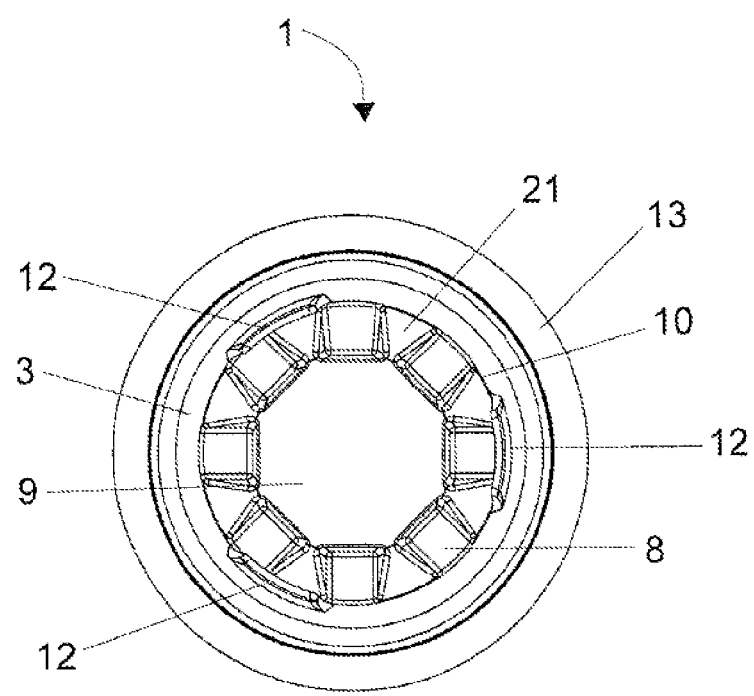
Figure 3:
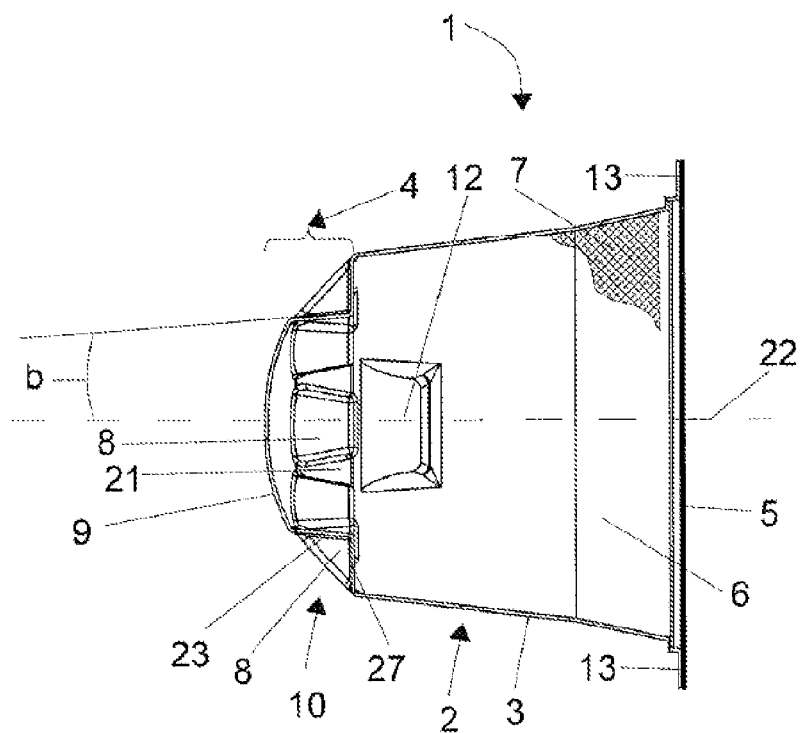
Figure 4:
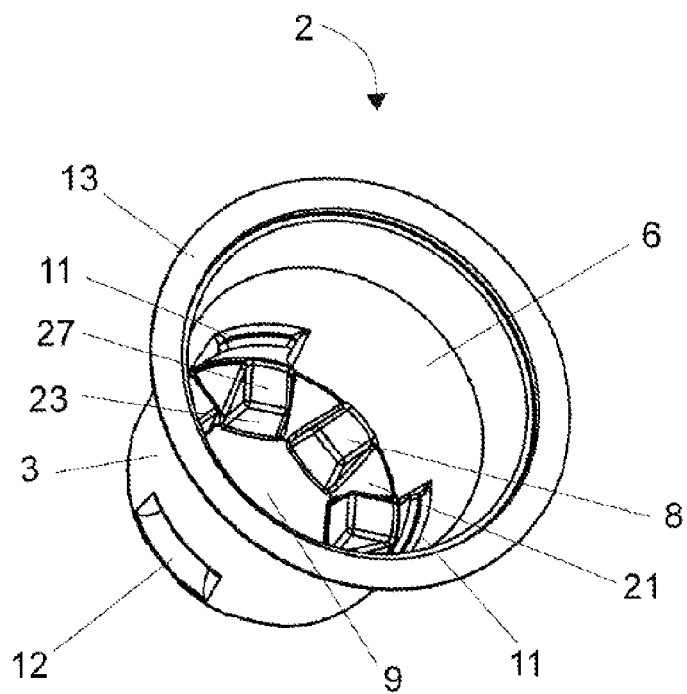
Figure 5:
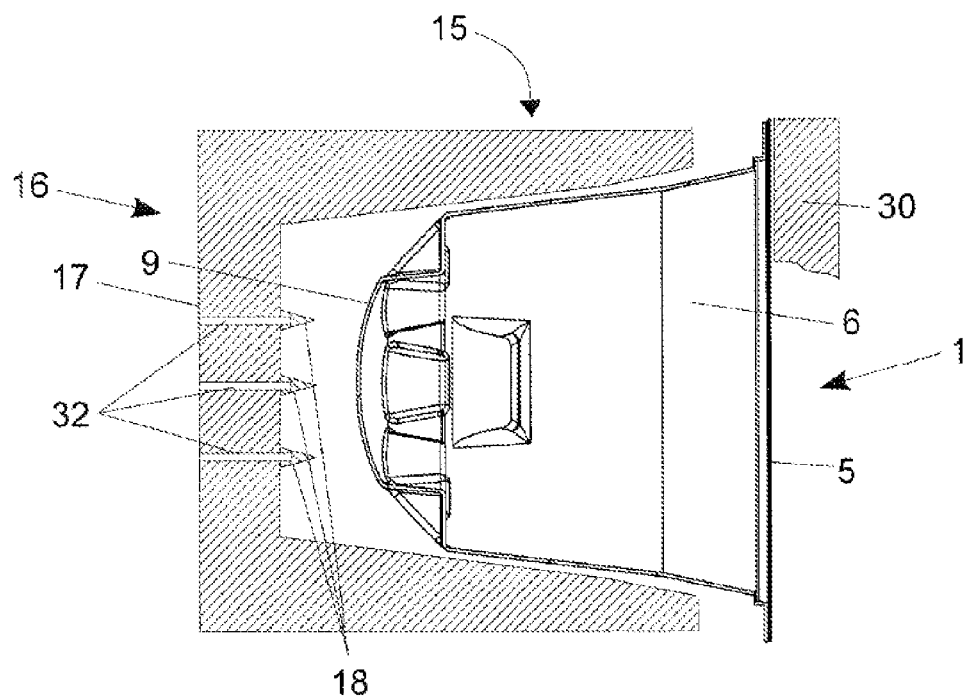
Figure 6:
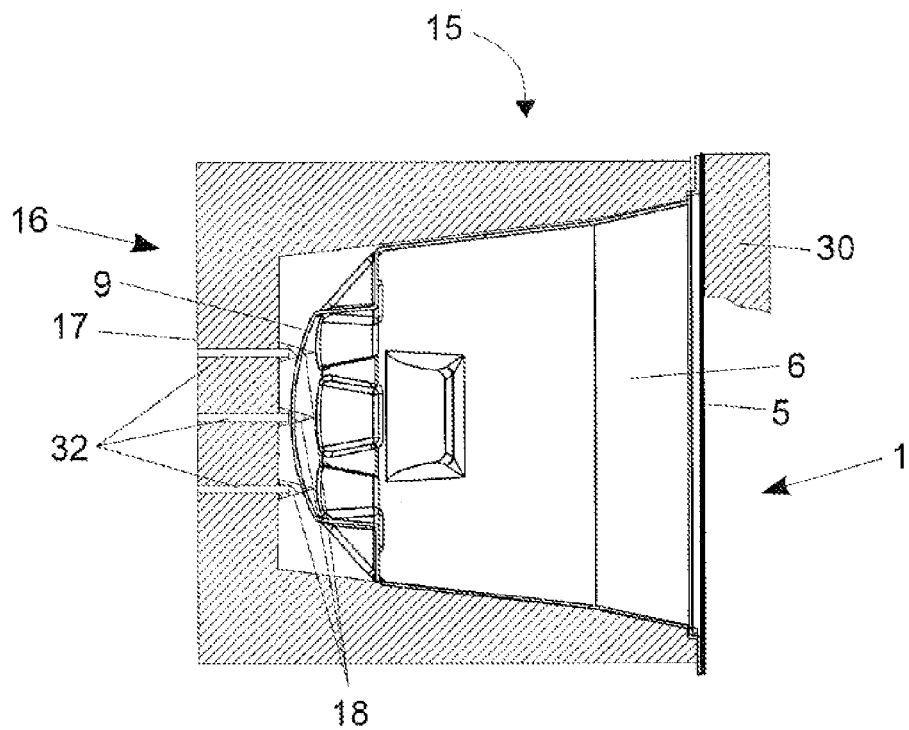
Figure 7:
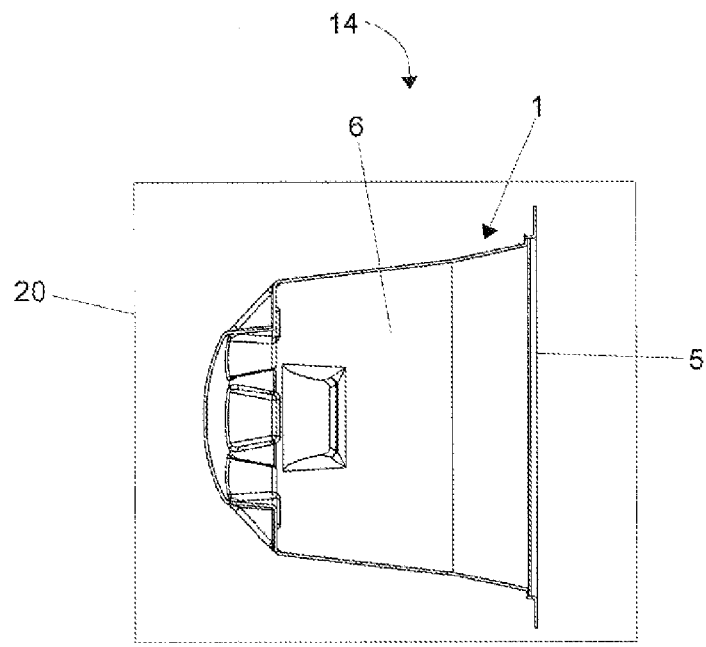
Figure 8:
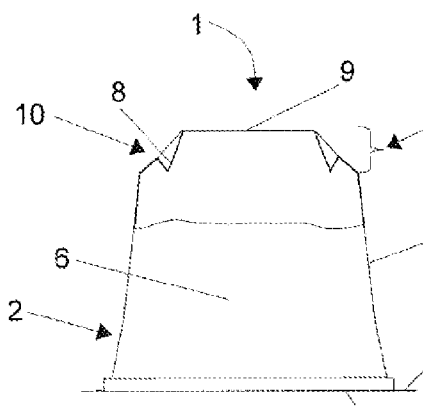
Figure 9:
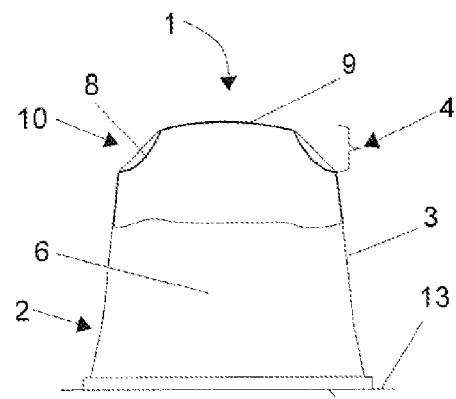
Figure 10:
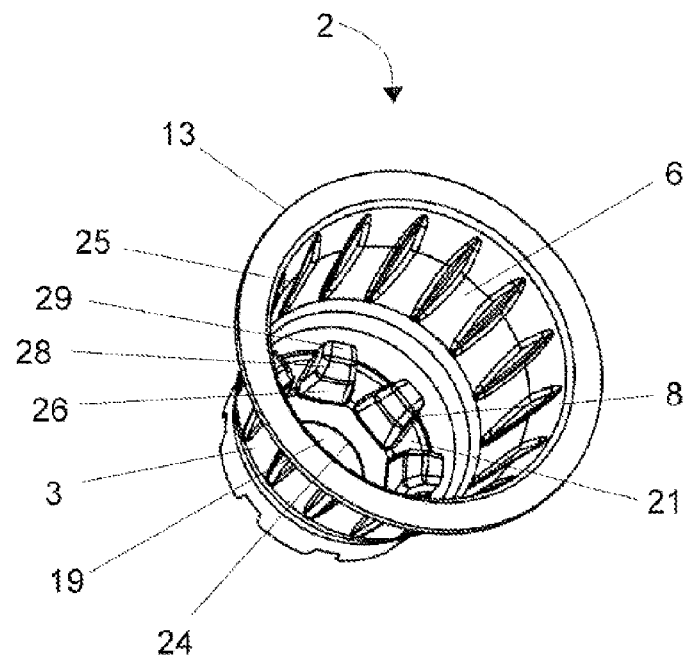
Figure 11:
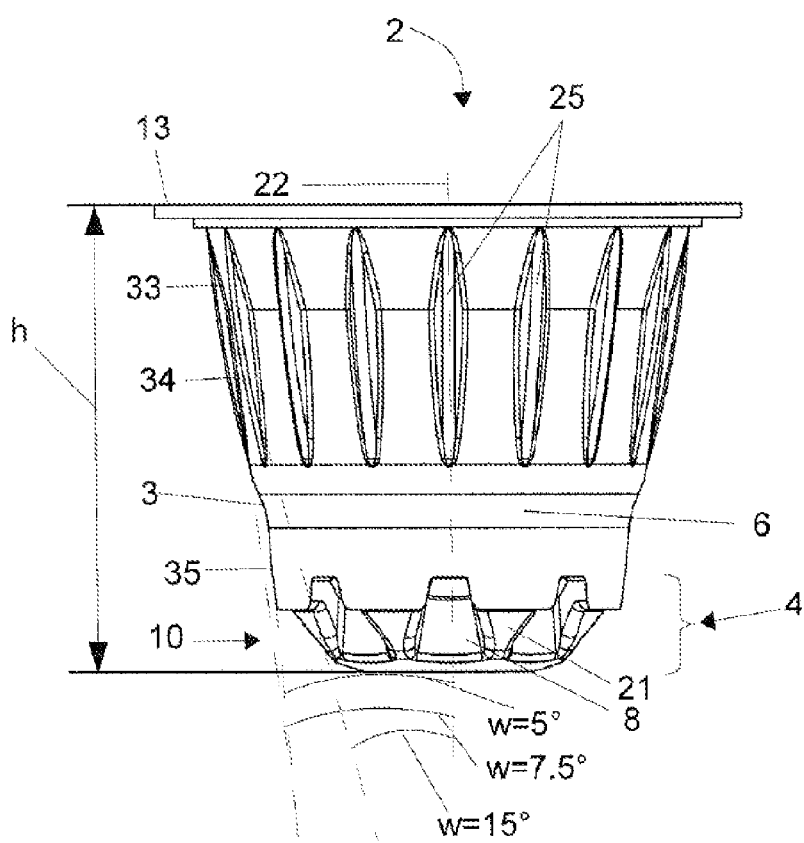
Figure 12:
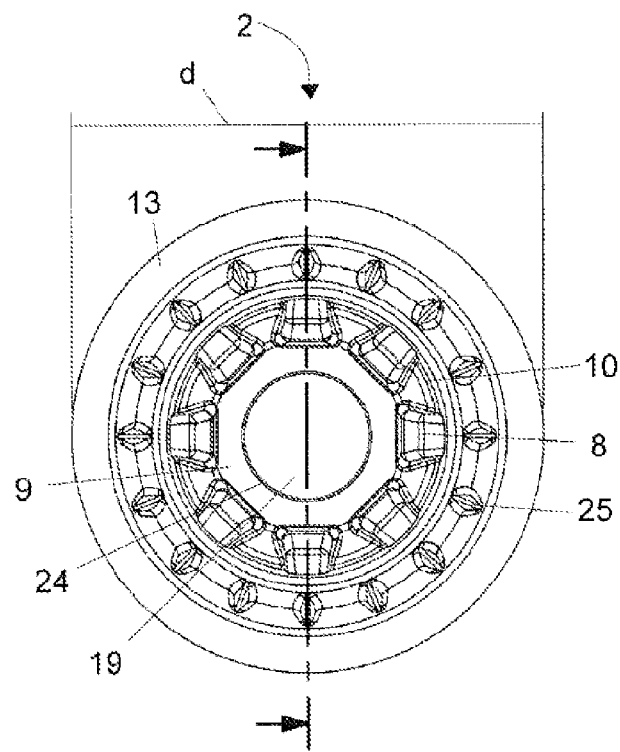
Figure 13:
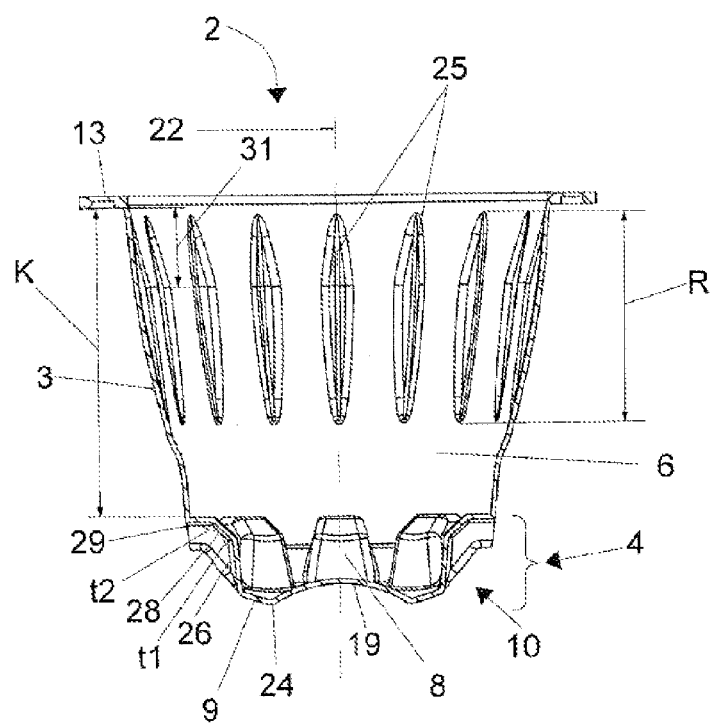

For better understanding, further features and advantages of the invention are explained below by way of exemplary embodiments without the invention being restricted to the exemplary embodiments, in which, in detail:

FIG. 1: shows a side view of a capsule as claimed in the invention;

FIG. 2: shows a top view of the capsule according to FIG. 1;

FIG. 3: shows a cross section of the capsule according to FIG. 1 from another angle of view, filled with a substance;

FIG. 4: shows a perspective view from above of a capsule body of the capsule according to FIG. 1;

FIG. 5: shows a schematic representation of a system as claimed in the invention consisting of a capsule and a beverage production apparatus in a first position;

FIG. 6: shows the system according to FIG. 5 consisting of a capsule and a beverage production apparatus in a second position;

FIG. 7: shows a schematic representation of a portion packaging as claimed in the invention including a capsule which is filled with a substance having a covering;

FIG. 8: shows a partly sectioned side view of an alternative capsule as claimed in the invention;

FIG. 9: shows a partly sectioned side view of a further alternative capsule as claimed in the invention;

FIG. 10: shows a perspective view from above of a capsule body with reinforcement ribs;

FIG. 11: shows a side view of the capsule according to FIG. 10;

FIG. 12: shows a top view of the capsule according to FIG. 10;

FIG. 13: shows a cross section of the capsule according to the FIG. 10.

FIG. 1 shows a side view of a capsule 1 as claimed in the invention at right angles to the longitudinal axis 22 of the capsule 1.

The capsule 1 has a capsule body 2 having a side wall 3 and having a base 4 which is realized integrally with said side wall. The base 4 is dome-shaped. In addition, the capsule 1 has a lid 5 which, in this case, consists of an aluminum foil which is not perforated. The lid 5 is mounted on a flange 13.

The capsule body 2 and the lid 5 form a closed chamber 6, into which a substance (not shown here) is filled, said substance being coffee.

In the base 4 of the capsule body 2, the capsule body 2 has a penetration region 9 as well as a reinforcement region 10. The reinforcement region 10 is arranged around the penetration region 9. In the reinforcement region 10, the base 4 has portion-wise recesses 8. Between said portion-wise recesses 8, the base 4 in the reinforcement region 10 is realized in the form of triangular webs 21 for better reinforcement of the base 4 of the capsule 1. The portion-wise recesses 8 in the reinforcement region 10 are realized in a step-shaped manner.

In the side wall 3 of the capsule 1, it is possible to see two of three outside recesses 12 which are spaced apart from one another along the circumference and are complementary to inside projections (not visible here) which are arranged in the closed chamber 6.

A face portion of the recess 8 encloses an angle a of 10° with the cutting plane parallel to the longitudinal axis 22.

FIG. 2 shows a top view of the capsule as claimed in the invention according to FIG. 1, parallel to the longitudinal axis of the capsule 1. Identical references designate identical features in all the figures and are consequently only explained again where necessary.

With reference to the recesses 8, the reinforcement region 10 is arranged around the penetration region 9 in a rotationally symmetrical manner with reference to the discrete angle, i.e. with reference to rotations around substantially ⅛ of a full rotation through 360°.

FIG. 3 shows a cross section of a capsule 1 as claimed in the invention according to FIG. 1, containing a substance 7.

The capsule 1 includes a capsule body 2 having a side wall 3. In this case, unlike FIG. 1, a lid 5, which is realized as a perforated foil, is mounted on a flange 13 for forming the closed chamber 6 in which the substance 7 is accommodated.

The portion-wise recesses 8 are realized in a step-shaped manner and have an L-shaped form in a cutting plane parallel to the longitudinal axis 22 of the capsule body. An arm 23 of the L-shaped form of the portion-wise recess 8 encloses an angle b of 5° with the longitudinal axis 22. A second arm 27 encloses an angle of 90° with the longitudinal axis 22.

FIG. 4 shows a perspective representation from above of a capsule body 2 according to FIG. 1. The inwardly inverted, portion-wise recesses 8 are clearly visible here.

The capsule body 2 has a flange 13 which protrudes laterally beyond a capsule wall 3 and on which a lid can be fastened. The inside projections 11, i.e. the stacking shoulders, serve for singling out the capsules individually when they have been stacked one on top of another and are to be conveyed into a corresponding filling apparatus for filling for example with coffee.

The capsule body 2 has a chamber 6 which is sealable with a lid (not shown here).

A base of the capsule body 2 has a penetration region 9 and portion-wise recesses 8 which are arranged around the same. The portion-wise recesses 8 in the base are realized in the chamber 6 as elevations. Triangular webs 21 are formed between the portion-wise recesses 8.

FIG. 5 shows a schematic representation of a system 15 including a beverage production apparatus 16 with a straining plate 30 and a capsule 1 as claimed in the invention according to FIG. 1.

The capsule 1 is filled with a substance (not shown), coffee in this case, and is inserted partly into a capsule holder 17 for the accommodation of the capsule 1. The capsule holder 17 has three devices 18 for penetrating a penetration region 9 of the capsule 1. By means of said devices for penetrating, heated water can be conveyed through the openings 32 into the capsule 1 for extraction of a beverage, which is then discharged through a lid 5 of the capsule 1, which here, unlike FIG. 1, is realized as a filter, through the straining plate 30 of the beverage production apparatus 16. In the open position shown, the straining plate 30 and the lid 5 are spaced apart from one another.

FIG. 6 shows the system 15 including the capsule 1 in a second position, i.e. a closed position. In the representation shown here, the penetration region 9 of the capsule 1 has already been penetrated by the device 18 for penetration. By means of the device 18 for penetration, as already explained in relation to FIG. 5, heated water can be conveyed at a pressure, here 15 bar, into the capsule. As a result, the substance 7 containing coffee is extracted and is conveyed through a lid 5, which here, unlike FIG. 1, is realized as a perforated foil, out of the capsule through a straining plate 30 of the beverage production apparatus 16 into a drinking vessel (not shown).

FIG. 7 shows a portion packaging 14 including a capsule 1 as claimed in the invention according to FIG. 1, filled with a substance containing coffee. The capsule 1 has a lid 5, which here, unlike FIG. 1, is realized as filter paper and is not aroma-tight. For transport and/or storage of the capsule 1, said capsule is packaged by means of a covering 20 and is sealed in a substantially air-tight manner in order to obtain an aroma-tight packaging.

FIG. 8 shows a partly sectioned side view of an alternative capsule 1 as claimed in the invention. The present capsule 1 has just two recesses 8. Unlike the capsule 1 according to FIG. 1, the portion-wise recesses 8 in the base 4 are realized here in cross section as two wall portions which are inclined toward one another at an acute angle. In addition, the penetration region 9 is realized as a flat region.

FIG. 9 shows a partly sectioned side view of a further alternative capsule 1 as claimed in the invention. The base 4 has a penetration region 9 and a reinforcement region 10 which has two portion-wise recesses 8 which, in cross section, are designed in an arcuate manner.

FIG. 10 shows a perspective representation from above of a capsule body 2 with sixteen reinforcement ribs 25.

Unlike the representation according to FIG. 4, the present capsule has a center indentation 19 with a reinforcement line 24 in the base. The recess 8 has three wall portions with are inclined toward one another with a first wall portion 26 which corresponds to the arm in FIG. 3. In addition, the recess has a second wall portion 28 and a third wall portion 29. The third wall portion 29 according to FIG. 10 corresponds substantially to the second arm according to FIG. 3.

FIG. 11 shows a side view of the capsule according to FIG. 10. A height H of the capsule body 2 is approximately 29 mm.

The capsule body 2 is realized integrally with the reinforcement ribs 25 which are arranged on the capsule wall 3 and the base 4 with the reinforcement region 10. The capsule body consists of a biopolymer.

The capsule body 2 is in the form of a truncated cone, a truncated cone angle w between the longitudinal axis 22 and the capsule wall 3 being different in portions along the longitudinal axis 22. In a first portion 33 of the capsule wall, the capsule body has a truncated cone angle of approximately $w=15°$, in a second portion 34 of approximately $w=7.5°$ and in a third portion 35 of approximately $w=5°$.

FIG. 12 shows a top view of a capsule body 2 according to FIG. 10. The bold broken line represents a cutting line, the corresponding sectional representation being shown in FIG. 13.

The capsule body 2 has a diameter D of approximately 37 mm on the flange 13.

FIG. 13 shows the sectional representation along the cutting line indicated in FIG. 12.

A rib length R of approximately 16 mm is smaller than a capsule wall length K of approximately 22 mm.

The region explained in relation to FIG. 11 with a truncated cone angle w=15° corresponds to the cone portion 31 according to FIG. 13. The length of the cone portion 31 is approximately 6 mm.

The base 4 including the reinforcement region 10 has recesses 8 with a first wall portion 26, a second wall portion 28 and a third wall portion 29.

The first wall portion 26 encloses an angle b of approximately 5° with the longitudinal axis 22. The second wall portion 28 encloses a first external angle t1 of 50° with the first wall portion. The third wall portion 29 encloses a second external angle t2 of 45° with the second wall portion 28.

The invention claimed is:

1. A capsule consisting of a rotationally symmetrical capsule body having a side wall and having a base which is realized integrally with said side wall as well as having a lid which covers the capsule body for forming a closed chamber which contains a substance for the preparation of a beverage,
   wherein, for conducting a liquid through the chamber, at least the base is penetrable at a penetration region of the base by way of a device which is arranged outside of the capsule, and wherein the base has a reinforcement region,
   wherein a central region of said base is realized as the penetration region,
   wherein said reinforcement region is arranged in a rotationally symmetrical manner around said penetration region, and wherein said reinforcement region is realized in the base as at least one portion-wise recess substantially in the circumferential direction,
   wherein said portion-wise recess has three wall portions which are inclined toward one another,
   wherein a first wall portion lies in a cutting plane, which extends along the longitudinal axis of the capsule body, substantially parallel to the longitudinal axis of the capsule body or encloses an angle with the longitudinal axis within the range of ±20°,
   wherein a second wall portion encloses a first external angle with the first wall portion within the range of between 35° and 55°,
   and wherein a third wall portion encloses a second external angle with the second wall portion within the range of between 35° and 55°.

2. The capsule as claimed in claim 1, wherein the portion-wise recess is realized in at least one of a step-shaped manner or an L-shaped manner in a cutting plane which extends along the longitudinal axis of the capsule body, wherein one arm of the L-shape lies substantially parallel to the longitudinal axis of the capsule body or encloses an angle with the longitudinal axis within the range of ±20°, wherein a second arm of the L-shape lies substantially at right angles to the longitudinal axis or encloses an arm angle with the longitudinal axis within the range of between 70° and 110°.

3. The capsule as claimed in claim 1, wherein the portion-wise recess has at least one face portion parallel to a cutting plane, which extends along the longitudinal axis of the capsule body, through the recess or the face portion with said cutting plane encloses an angle within the range of ±45°.

4. The capsule as claimed in claim 1, wherein the base has at least two portion-wise recesses.

5. The capsule as claimed in claim 4, wherein the base between the portion-wise recesses is realized as a triangular web.

6. The capsule as claimed in claim 1, wherein the capsule body consists of at least two polymer layers and is produced using a deep-drawing method.

7. The capsule as claimed in claim 6, wherein an outer layer of the capsule body consists of polyethylene.

8. The capsule as claimed in claim 1, wherein the lid is formed from at least one of an aluminum foil, a perforated foil or filter paper or arbitrary combinations thereof.

9. The capsule as claimed in claim 1, wherein the penetration region has a center indentation.

10. The capsule as claimed in claim 1, wherein the side wall of the capsule has at least two reinforcement ribs which are arranged on the outside substantially parallel to the longitudinal axis and which are spaced apart from one another along the circumference, wherein the capsule body including the capsule wall and the reinforcement ribs are realized integrally.

11. The capsule as claimed in claim 1, wherein the capsule body is realized as a truncated cone, wherein a truncated cone angle between the longitudinal axis and the side wall of the capsule is different in portions along the longitudinal axis.

12. The capsule as claimed in claim 10, wherein the capsule body has at least three portions with a different truncated cone angle.

13. A capsule body for a capsule as claimed in claim 1.

14. The capsule as claimed in claim 1, wherein the capsule is enclosed in a substantially air-tight manner by a covering.

15. A system including a capsule which is filled with a substance as claimed in claim 1 and a beverage production apparatus, wherein the beverage production apparatus has a capsule holder for accommodating a capsule, as well as a device for penetrating a base of the capsule and for supplying a liquid into the capsule for extracting the substance for producing a beverage, wherein the beverage can be discharged through a lid of the capsule.

16. The capsule as claimed in claim 1, wherein the
   capsule body consists of at least three layers, said layers consisting in each case of one of the following materials or of an arbitrary combination therefrom:
   polypropylene, polyethylene and ethylene vinyl alcohol, and wherein the capsule body is produced using a deep drawing method.

* * * * *